United States Patent [19]

Prassas et al.

[11] Patent Number: 5,257,826

[45] Date of Patent: *Nov. 2, 1993

[54] MULTIPLE PURPOSE IRRIGATION FITTING

[75] Inventors: Thomas N. Prassas, Glendale; Shannon Bard, Scottsdale, both of Ariz.

[73] Assignee: Aquapore Moisture Systems, Inc., Phoenix, Ariz.

[*] Notice: The portion of the term of this patent subsequent to Apr. 14, 2009 has been disclaimed.

[21] Appl. No.: 986,557

[22] Filed: Dec. 7, 1992

[51] Int. Cl.5 ............................................ F16L 25/00
[52] U.S. Cl. ...................... 285/175; 285/12; 285/177; 285/247; 285/150; 285/155; 285/423; 285/238
[58] Field of Search ............... 285/12, 156, 177, 175, 285/150, 155, 247, 901, 423, 906, 238; 239/145, 542; 405/36, 45

[56] References Cited

U.S. PATENT DOCUMENTS

| | | | |
|---|---|---|---|
| 3,958,761 | 5/1976 | Watanabe | 239/542 |
| 4,722,481 | 2/1988 | Lemkin | 239/542 |
| 4,810,008 | 3/1989 | Brodie | 285/156 |
| 4,971,366 | 11/1990 | Towsley | 285/12 |
| 5,069,388 | 12/1991 | Prassas et al. | 239/145 |
| 5,104,150 | 4/1992 | Bard et al. | 285/12 |
| 5,131,597 | 7/1992 | Bard et al. | 239/145 |

FOREIGN PATENT DOCUMENTS

| | | | |
|---|---|---|---|
| 275657 | 7/1966 | Australia | 285/238 |
| 3346141 | 12/1984 | Fed. Rep. of Germany | 285/238 |
| 376326 | 5/1964 | Switzerland | 285/238 |
| 406685 | 2/1934 | United Kingdom | 285/238 |
| 1246490 | 9/1971 | United Kingdom | 285/238 |
| 1421452 | 1/1976 | United Kingdom | 285/238 |

Primary Examiner—Eric K. Nicholson
Attorney, Agent, or Firm—Marvin E. Jacobs

[57] ABSTRACT

A fitting for connecting together porous and non-porous irrigation tubing, threaded garden hose, and pipe with conventional pipe thread. Some openings in the fitting have both exterior male threads to engage the hose and interior compression rings to engage the tubing. Another opening in the fitting is provided with pipe threads to allow connection to ordinary threaded risers used in underground distribution systems.

6 Claims, 1 Drawing Sheet

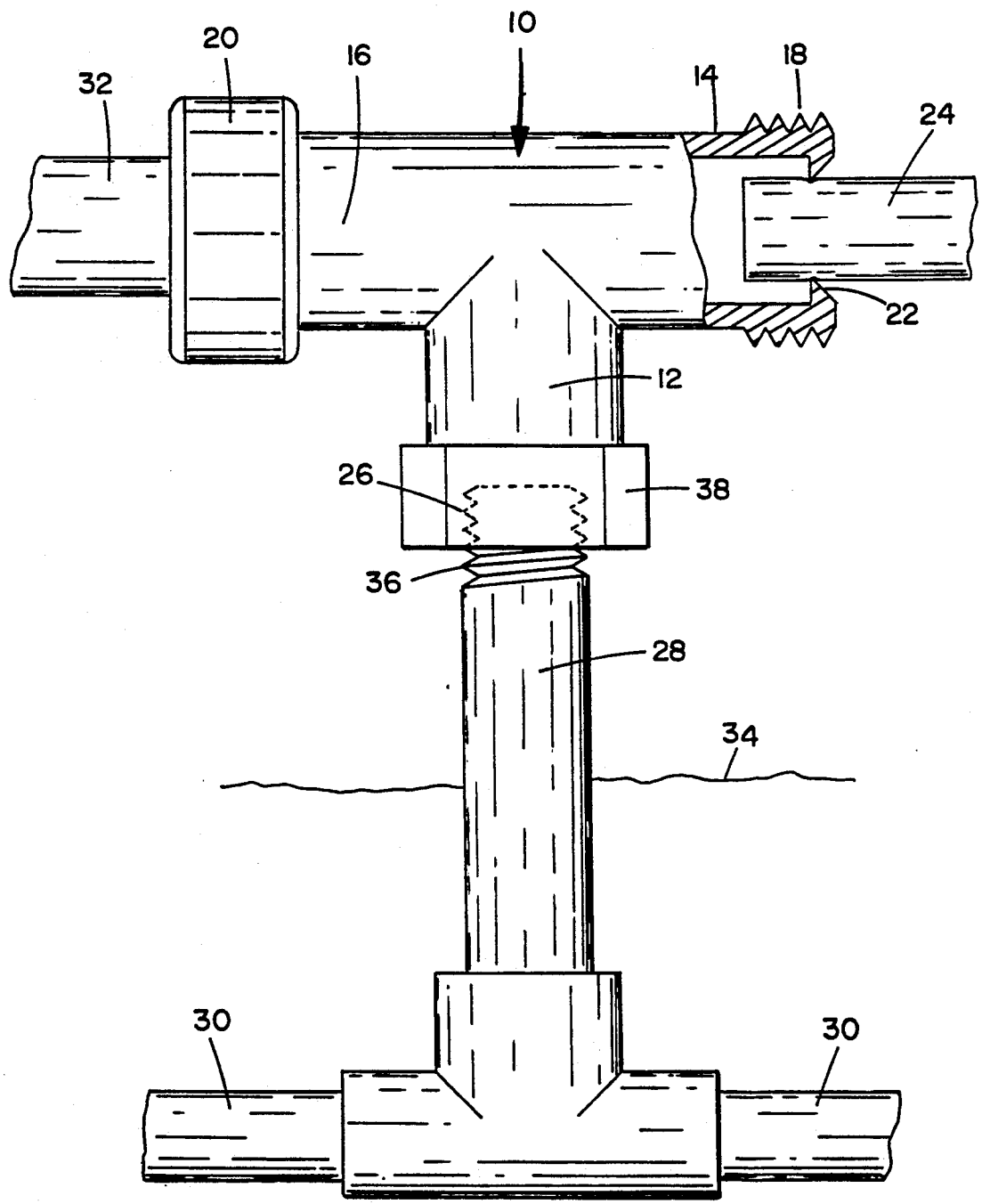

MULTIPLE PURPOSE IRRIGATION FITTING

TECHNICAL FIELD

This invention relates to irrigation systems that use a variety of components selected individually and connected together to form a customized watering system tailored to the particular arrangement of plants served by the system. More specifically, a new fitting is disclosed that can replace a large number of different type prior art fittings so as to make the selection of components easier, save money, increase flexibility, and simplify future modifications.

BACKGROUND OF THE INVENTION

This invention is an improvement to U.S. Pat. No. 5,104,150 issued Apr. 14, 1992 to Shannon Bard and Thomas N. Prassas, the inventors of the present invention. The teachings of U.S. Pat. No. 5,104,150 are incorporated herein by reference. Our prior patent discloses an irrigation fitting that can connect together either irrigation tubing or threaded garden hose with the same fitting. This invention extends that concept to provide a fitting that can fasten directly to a pipe thread riser of the type generally used to feed sprinkler heads from networks of underground pipes so that, for the first time, garden hose, porous hose, and impervious tubing can all be connected to a standard pipe thread sprinkler system with just one universal fitting.

To insure efficient water usage, modern irrigation systems deliver water in controlled amounts precisely to the desired plants so as to avoid runoff and evaporation. Two slightly different prior art designs have matured that are very popular. One employs impervious plastic tubing, usually polyethylene, to convey water through a collection of tee fittings, elbows, and couplings so as to distribute the water to the various plants. At each chosen location, a point source emitter attaches to the tubing with a barbed connector inserted through the tube wall.

Another prior art design employs pervious or porous tubing, also known as soaker hose in the art, that sweats water along its entire length so as to create a line source suitable for rows of plants and the like. Porous pipe may also be connected together with elbows, couplings, and tee shaped fittings to create an elaborate distribution network.

Since the above two prior art systems have evolved separately, they generally do not use compatible fittings and are not connectable to each other. It would be advantageous, however, if they could be combined to obtain in a single water circuit the benefits of both types of distribution systems. For example, impervious tube allows the exact positioning of just the right kind of point source emitter to provide a spray pattern optimized for the task, or perhaps a drip at the base of a plant. Porous hose, on the other hand, is simpler to assemble and maintain. It can be buried underground safe from frost, erosion, and evaporation. But building up a complex water distribution system in either system requires a lot of different parts to be combined and joining both systems into one was not practical until the fitting disclosed in our above referenced patent became available.

Still older prior art systems use underground pipe with standard pipe threads to feed a series of sprinkler heads or bubblers through threaded risers that protrude from the surface of the ground. This invention allows garden hose, porous hose, and impervious tube to all be connected to such an underground system riser.

STATEMENT OF THE INVENTION

Briefly, the present invention discloses a multiple purpose fitting that serves the function of several different single purpose fittings in the prior art. The multi-purpose fitting accommodates both solid and porous tubing, conventional threaded garden hose, and a feeder pipe of the type usually used to supply water to the distribution system. Such feeder pipes have conventional pipe threads, which are different from garden hose threads.

Numerous benefits are realized with this multi-purpose fitting. When one is planning an irrigation system, the task is greatly simplified since one fitting will perform all functions. The consumer need not count up the number of elbows and couplings and end caps and tees but rather just buy a batch of multi-purpose fittings. If the plan changes during installation, no problems arise. The system can be easily expanded in the future. Also, this invention reduces the number of items that a store must stock. Lower inventories and less complexity yields lower costs so that the irrigation system is more economical.

With this new fitting, a more efficient, low volume irrigation distribution system may be added to an existing underground standard pipe system simply by replacing a sprinkler or bubbler head with the new fitting of this invention and connecting any desired low volume system thereto. Additional advantages and benefits are elucidated in the following more detailed drawings and descriptions.

BRIEF DESCRIPTION OF THE DRAWINGS

The drawing Figure shows an elevational view of the multiple purpose fitting of the present invention connected to tubing on the right, conventional threaded garden hose on the left, and a threaded riser pipe at the bottom.

DETAILED DESCRIPTION OF THE INVENTION

The multi-purpose fitting 10 of the present invention is shown in the drawing. Fitting 10 comprises a generally hollow, water conveying structure with three openings 12, 14, and 16. Any shape could be adopted but the preferred embodiment is approximately in the shape of a tee with the openings at 90 degree relative angles. Openings 14 and 16 are similar having male threads 18 on the outside, to accommodate the industry standard garden hose threaded connector such as connector 20. As shown in our previous U.S. Pat. No. 5,104,150, one or more caps may be used to close off openings 14 and 16 if desired, but these caps are not pictured in the drawing. In the preferred embodiment, the fitting may be made from ABS plastic or the like.

Opening 14 is partly cut away in the drawing to show the interior details thereof. A compression ring 22 serves to encircle and grip a tube 24 inserted into opening 14. Tube 24 may comprise a porous type tube, to provide a line source irrigation tube, or an impervious tube to supply water to point source water distribution devices. Ring 22 has an inwardly projecting lip of diameter slightly less than the outside diameter of the tube 24. When the tube 24 is forced into opening 14 and pressurized with water, it expands against the lip of ring 22 and stays firmly in place in a manner well known to those skilled in the art. The compression rings 22 in a single fitting may be of different diameters or different fittings may have different compression rings. But the simplest and most efficient system would use one diameter for the impervious tubing and porous hose and an appropriate compression ring diameter to seal that size tube and hose.

The exterior threads 18 also allow the attachment of the familiar garden hose type connector as shown by hose 32 and female hose connector 20 in the drawing.

The enhanced aspect of this invention incorporates pipe threads 26 inside opening 12 so that fitting 10 may be threaded directly onto a threaded riser pipe 28. The most common and typical underground irrigation systems use plastic pipes 30 buried under the surface 34 of the ground from which a plurality of risers 28 are connected to deliver water to just above the surface 34. Risers 28 have standard pipe threads 36 which are not the same as the garden hose threads 18. Normally, sprinkler heads and the like are screwed onto threads 36. Fitting 10, because of its pipe threads in branch opening 12, may be threaded onto the riser instead, so as to allow connections to be made to either garden hose 32, with garden hose threads 18, or porous or non-porous tubes 24. Fitting 10 is molded with a hexagonal gripping surface 38 thereon to allow the use of a wrench to tighten fitting 10 onto riser 28.

In an alternative embodiment, fitting 10 may include external male type threads about the outside of branch 12 so as to allow direct connection to risers that have internal female type threads.

New fitting 10 saves a large number of parts as compared to the multi-purpose fitting disclosed in our U.S. Pat. No. 5,104,150. To equal the functionality of our present inventive fitting 10, a special adapter would have to be fastened to riser 28 to allow the attachment of either a garden hose or a tube. Then, a separate three opening multi-purpose fitting would be connected to the hose or tube. The present invention allows direct connection to an underground distribution riser that will feed any other type of common irrigation component directly.

Other modifications will become apparent to those skilled in the art which do not depart from the spirit and scope of this invention as defined by the appended claims.

We claim:

1. A multiple purpose irrigation system fitting for connecting together both compatible and incompatible type hoses comprising a water conveying hollow container with multiple openings therein, some of said openings having external threads thereon to engage standard garden hose female threaded connectors and each of said some openings also having an internal compression ring adapted to, by itself, engage and grip a tube inserted therein, and in which one of said multiple openings is provided with pipe threads so as to allow direct connection to a pipe based water distribution system.

2. The fitting of claim 1 in which the pipe threads on said fitting are internal female type threads.

3. The fitting of claim 2 including wrench engageable flat surfaces about the outside of the opening with the pipe threads.

4. The fitting of claim 3 in which said container is tee shaped with the openings disposed at approximate right angles relative to each other.

5. The fitting of claim 4 in which the fitting has three openings, two of said openings having the internal compression, tube engaging, rings and the external garden hose engaging threads, and the third opening having said pipe threads.

6. The fitting of claim 1 in which the hollow container has three openings, two with said internal compression rings and said external threads, and the third opening having said pipe threads.

* * * * *